(12) United States Patent
Soulie

(10) Patent No.: US 8,868,113 B2
(45) Date of Patent: Oct. 21, 2014

(54) METHOD FOR MONITORING ENTITIES

(71) Applicant: Thales, Neuilly sur Seine (FR)

(72) Inventor: Antoine Soulie, Gennevilliers Cedex (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/178,500

(22) Filed: Feb. 12, 2014

(65) Prior Publication Data

US 2014/0162708 A1    Jun. 12, 2014

Related U.S. Application Data

(62) Division of application No. 13/610,191, filed on Sep. 11, 2012, now Pat. No. 8,694,029.

(30) Foreign Application Priority Data

Sep. 12, 2011   (FR) ..................................... 11 02746

(51) Int. Cl.
*H04W 24/00*   (2009.01)
*H04W 4/12*    (2009.01)
*H04W 28/06*   (2009.01)
*G08G 1/00*    (2006.01)
*G08G 1/01*    (2006.01)

(52) U.S. Cl.
CPC ............. *H04W 28/06* (2013.01); *G08G 1/0104* (2013.01); *H04W 4/12* (2013.01); *G08G 1/20* (2013.01)
USPC ...................... 455/457; 455/456.5; 455/456.6; 701/409

(58) Field of Classification Search
CPC ......... H04W 4/02; H04W 64/00; G01C 21/32
USPC ..................... 455/457, 456.5, 456.6; 701/409
See application file for complete search history.

(56) References Cited

U.S. PATENT DOCUMENTS

| 2004/0102893 | A1* | 5/2004 | Atkinson et al. | ............... 701/117 |
| 2009/0043462 | A1* | 2/2009 | Stratton et al. | ................... 701/50 |
| 2010/0289641 | A1* | 11/2010 | Kates | ............................ 340/541 |
| 2010/0305847 | A1* | 12/2010 | Gluck | ........................... 701/201 |
| 2010/0318291 | A1* | 12/2010 | Gluck | ........................... 701/208 |
| 2013/0300573 | A1* | 11/2013 | Brown et al. | ............ 340/870.01 |
| 2013/0332068 | A1* | 12/2013 | Kesar et al. | ................... 701/430 |
| 2014/0038511 | A1* | 2/2014 | Hall | ............................ 455/3.01 |

* cited by examiner

*Primary Examiner* — Danh Le
(74) *Attorney, Agent, or Firm* — Thompson Coburn LLP

(57) ABSTRACT

The inventive method for monitoring entities (10) moving in a monitored space represented by a first digital model (14) comprising a set of maps (16) divided into geographical zones (18) of a predetermined shape, and having a size defined according to the level of granularity, includes:
 identifying geographical zones (18) of each map (16),
 defining operational zones (24*a*, 24*b*) and associating each operational zone (24*a*, 24*b*) with a predefined level of granularity,
 configuration,
 positioning the entity (10),
 determining a level of granularity to be applied,
 determining a geographical zone (18) containing the entity (10),
 detecting a change of zone, and
 applying a new level of granularity as a function of the operational destination zone (24*a*, 24*b*).
The determination steps, the detection step, and the application step are carried out within each entity (10), independently.

8 Claims, 3 Drawing Sheets

METHOD FOR MONITORING ENTITIES

CROSS-REFERENCE TO RELATED APPLICATIONS

Figure 1:
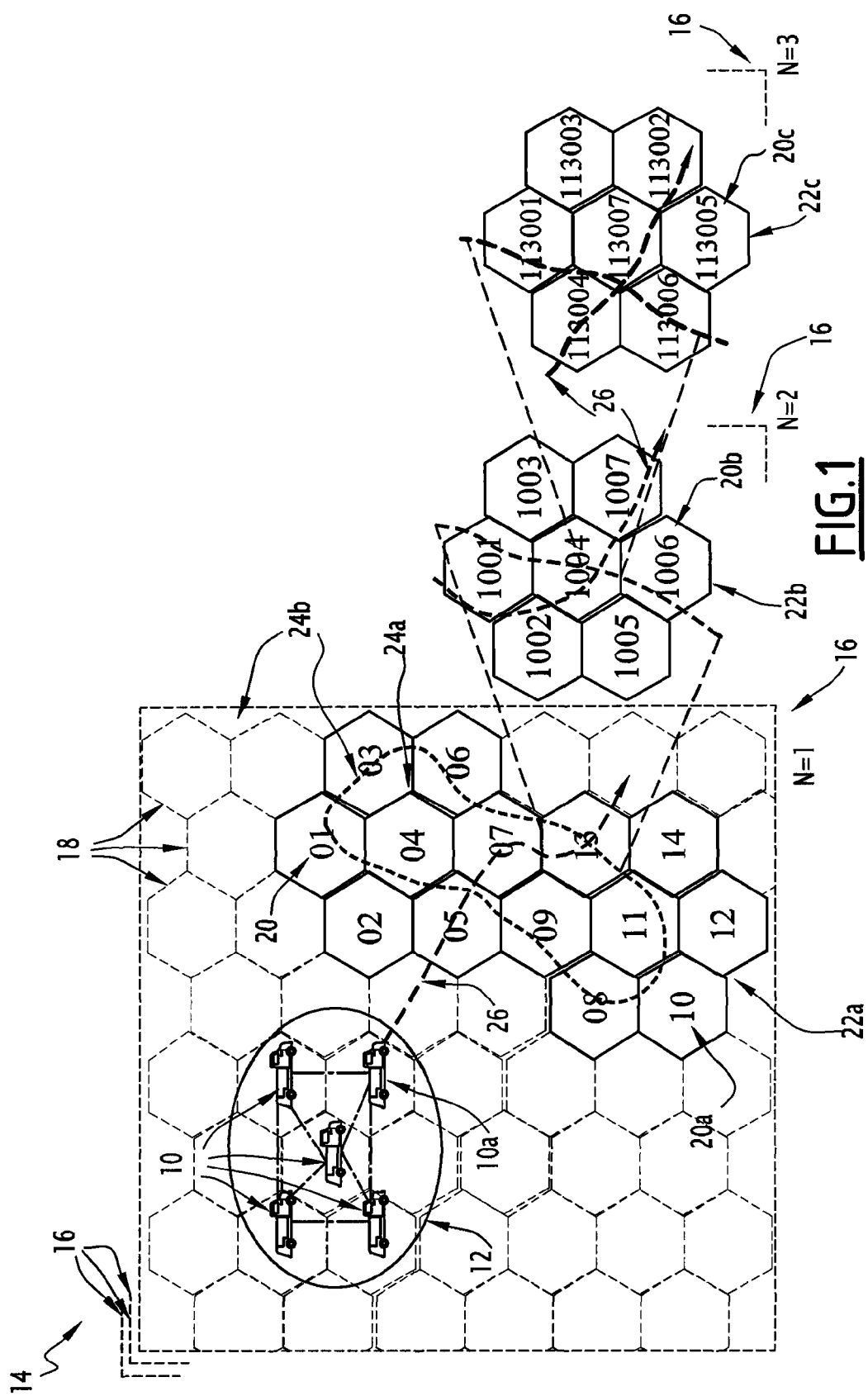

This application is a Divisional application of U.S. application Ser. No. 13/610,191, filed Sep. 11, 2012, which claims priority under 35 USC §119 to French patent application FR 11 02746, filed Sep. 12, 2011, both of which are incorporated herein by reference in their entireties.

The present invention relates to a method for monitoring entities moving in a monitored space represented by a first digital model comprising a set of maps with different levels of granularity representing a requested fineness of the monitoring, each map being divided into geographical zones of a predetermined shape, and having a size defined according to the level of granularity, the method including:
- an identification step for identifying geographical zones of each map in the form of a complete address, so as to identify each geographical zone uniquely,
- a definition step for defining operational zones and associating each operational zone with a predefined level of granularity,
- a configuration step for loading a set of data relative to the geographical zones associated with the maps of different levels of granularity, and the operational zones,
- a positioning step for positioning the entity, so as to determine the geographical coordinates of the monitored entity,
- a determination step for determining a level of granularity to be applied, as a function of the geographical coordinates of the monitored entity,
- a determination step for determining a geographical zone, from a map with the predetermined level of granularity, containing the entity,
- a detection step for detecting a change of zone as a function of the geographical coordinates of the monitored entity, the monitored entity either going from an original geographical zone to a destination geographical zone without changing operational zones, or from an original operational zone to a destination operational zone, and
- an application step for applying a new level of granularity as a function of the operational destination zone, in the case of a change of operational zone.

The present invention also relates to an entity moving in the monitored space represented by a first digital model comprising a set of maps of different levels of granularity representing a requested fineness of the monitoring, each map being divided into geographical zones of a predetermined shape, and having a size defined according to the level of granularity, the entity including:
- save means for loading a set of data relative to the geographical zones associated with the maps of different levels of granularity,
- means for positioning the entity, so as to determine the geographical coordinates of the monitored entity, and
- means for detecting a change of geographical zone as a function of the geographical coordinates of the monitored entity, the monitored entity going from an original geographical zone to a destination geographical zone.

A method for monitoring entities of the aforementioned type is known that is capable of monitoring changes of position of entities, such as vehicles, with a variable granularity. Each monitored vehicle moves in a monitored space divided into cells, or geographical zones, of predetermined size according to an applied level of granularity, and only reports the address of its cell if it changes cells. A first message comprising the address of the cell is sent via a communication network to a remote server that then determines the level of granularity as a function of a distance in relation to a global context, for example consisting of predetermined positions of other neighboring vehicles. The remote server then sends a second message including the determined level of granularity for the monitored entity, so as to inform the monitored entity of the change of granularity.

The sending of the first message upon each change of cell for all of the monitored vehicles to the remote server, as well as, in response, the second message from the remote server toward each monitored vehicle, transmitting the first message, requires that communications be established each time.

The problem is that the establishment of these communications creates a significant data traffic load in the case of a high number of vehicles and/or vehicles with high mobility, which can cause saturation of the communication network used. This problem is even more pronounced when as the communication network used has a limited capacity in terms of bandwidth and throughput.

The aim of the invention is therefore to reduce the data traffic load associated with changes of geographical zones by monitored vehicles, on low bandwidth communication networks.

To that end, the invention relates to a monitoring method of the aforementioned type, characterized in that the determination steps, the detection step, and the application step are carried out within each entity, independently, without outside communications.

According to other embodiments, the monitoring method includes one or more of the following features, considered alone or according to all technically possible combinations:
- the determination step for determining a level of granularity to be applied is specific to identifying the operational zone, so as to determine the level of granularity to be applied;
- it also includes a broadcasting step for broadcasting by a monitored entity to other entities of the message including geographical zone information;
- the geographical zone information includes either the complete address of the geographical zone of the entity, or a direction indication;
- the complete address includes the level of granularity and an identity of the geographical zones;
- the message also includes an identifier for the monitored entity, a reception reliability level of the message, and either a number of hops of the message to be relayed or a broadcast distance of the message;
- the message also includes a log of the last geographical zone messages, in order to overcome message losses;
- the shape of each geographical zone is hexagonal;
- the operational zones are defined on the second digital model of the monitored space, said second digital model being loaded into the entity during the configuration step.

The invention also relates to an entity, characterized in that the save means include a data set relative to operational zones comprising a predefined level of granularity, in that the detection means are capable of independently detecting a change of operational zone, the monitored entity going from an original operational zone to a destination operational zone, and in that the entity includes means for independently determining a level of granularity to be applied from the original operational zone, and a new level of granularity as a function of the destination operational zone, in the case of a change of operational zone.

Figure 2:
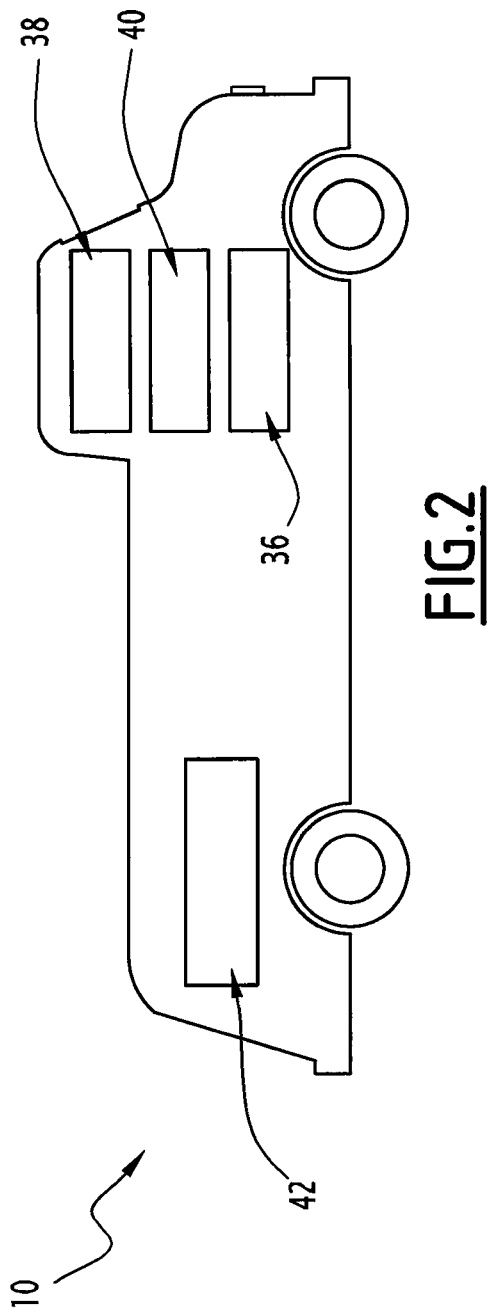
Figure 3:
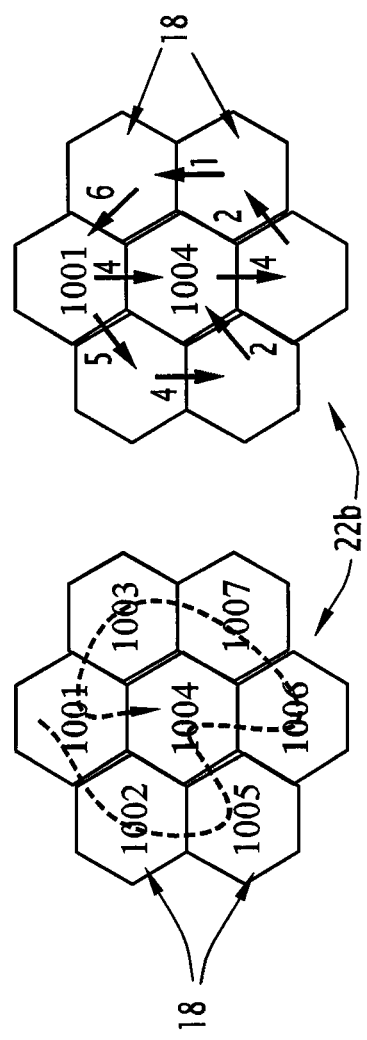
Figure 4:
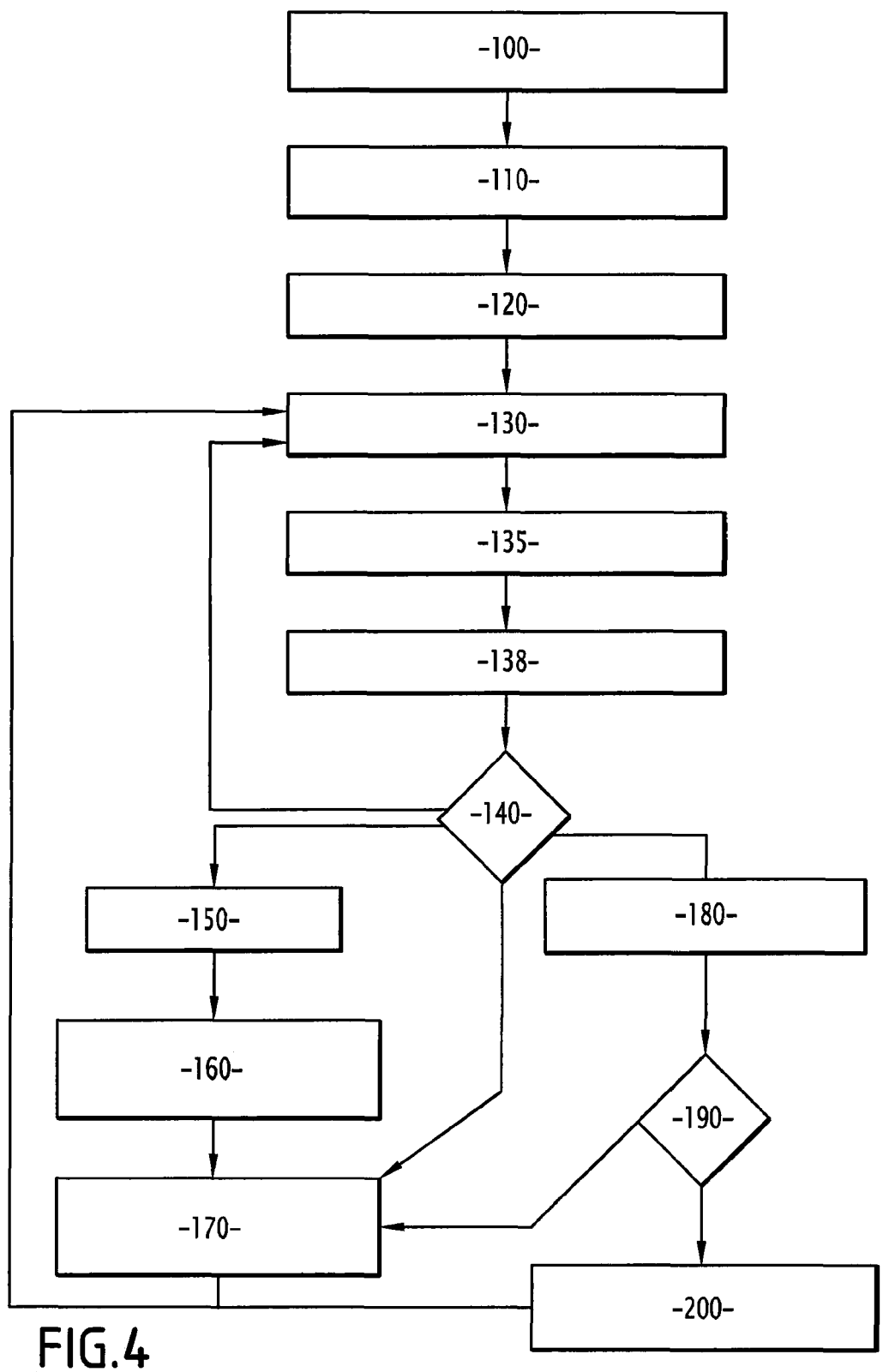

These features and advantages of the invention will appear upon reading the following description, provided solely as a non-limiting example, and done in reference to the appended drawings, in which:

FIG. 1 is a diagrammatic illustration of the monitored space comprising monitored vehicles, with the associated digital models, FIG. 2 is a diagrammatic illustration of a monitored vehicle according to the invention, FIG. 3 is an illustration of the monitoring of a vehicle moving throughout the different geographical zones, and FIG. 4 is a flowchart showing the monitoring method according to the invention.

In FIG. 1, several moving vehicles 10, or entities, are shown on an operating terrain, defined by an operational manager and corresponding to a space to be monitored during the mission of the vehicles 10 on the operating terrain. The vehicles 10 are able to communicate information to each other, for example regarding positions, through a wireless network 12, so as to ensure mutual position monitoring.

The network 12 uses an ad hoc-type communication method, in point-to-point or point-multipoint mode, capable of managing communications directly between vehicles 10, without requiring the use of an external communication infrastructure, such as a remote server or base station, for example.

The monitored space is digitized by an operator before the mission so as to obtain different digital representation models of the observation field, each model then being defined according to characteristics of the monitoring requested by the operations manager, then stored within each vehicle 10.

A first digital model 14, visible in FIG. 1, of the monitored space comprises a plurality of maps 16 of different levels of granularity and representative of a fineness of the monitoring requested for each vehicle 10 moving within the monitored space.

Each map 16 is divided into a set of geographical zones 18 with a predetermined shape and location. Preferably, as illustrated in FIG. 1, each geographical zone 18 has a hexagonal shape. The location of the geographical zones 18 of each map 16 for example corresponds to geographical coordinates of the GPS (Global Positioning System) type.

Each geographical zone 18 has a size defined according to the map 16 used, depending on the associated level of granularity. For example, for a space monitored in two dimensions with a square shape measuring 40 km per side, a first level of granularity N=1 of a first map 16 corresponds to a geographical zone 18 size of 10 km per side. For a same monitored space, a second level of granularity N=2 of a second map 16 corresponds to a geographical zone 18 size of 5 km per side.

Each geographical zone 18 of the different maps 16 also has a complete address, so as to identify each geographical zone 18 in a unique manner. Preferably, the complete address includes the level of granularity N and an identity 20 of the geographical zone 18, the identity 20 being a distinctive name, for example a number given to the geographical zone 18. For example, as illustrated in FIG. 1 using three groups 22a, 22b, 22c of geographical zones 18 with respective levels of granularity N=1, N=2 and N=3, the complete addresses of the geographical zones 18 corresponding to the concerned identities 20a, 20b, 20c are respectively: (N=1, Id=10), (N=2, Id=1006), and (N=3, Id=113005). It should be noted that groups 22b, 22c, respectively, show an enlarged view of part of the map 16 of level N=2, N=3, respectively, corresponding to part of the map of level N=1, N=2, respectively.

Two operational zones 24a, 24b, defined on the second digital model, are visible superimposed on the first digital model 14. The operational zones 24a, 24b make it possible to define zones for which a particular fineness is requested, such that a specific level of granularity is associated with each operational zone 24a, 24b. As an example, the operational zone 24a corresponds to a dangerous zone requiring precise monitoring of the vehicles 10, the operational zone 24b defined by the space outside the zone 24a corresponding to a non-dangerous zone.

A path 26 is visible in FIG. 1, representing the travel of a vehicle 10a successively passing through the operational zones 24b, 24a, and 24b, shown superimposed on the map 16 of granularity level N=1. Part of the path 26 of the vehicle 10a is also shown enlarged on group 22b, 22c, respectively, of geographic zones 18, belonging to the map 16 of level N=2, N=3, respectively.

FIG. 2 illustrates a diagram of the vehicle 10 according to the invention. The vehicle 10 corresponds to any land vehicle, such as a car, for example, capable of moving on the surface. The vehicle 10, situated at each moment in a current operational zone 24a, 24b, and in a current geographical zone 18, includes different pieces of equipment capable of ensuring mutual monitoring, independently, of the positions with all or some of the vehicles 10 of the communication network 12.

The vehicle 10 includes save means 36 comprising the data set relative to the geographical zones 18 and the operational zones 24a, 24b. More specifically, the save means 36 are able to store the first digital model 14 including the geographical zones 18 and the second digital model including the operational zones 24a, 24b. The save means 36 are also able to store the last known position, i.e. the last complete address received, of all or some of the other vehicles 10, and for example include a geographical monitoring database of the geographical zones 18 of all or some of the other vehicles 10. Lastly, the save means 36 make it possible to store the complete address of the vehicle 10, i.e. the identity of the current geographical zone 18 and the level of granularity of the current operational zone 24a, 24b of the vehicle 10.

The vehicle 10 also includes positioning means 38, for example equipment of the GPS type and/or an inertial unit, so as to obtain the current geographical coordinates of the vehicle 10 within the monitored space. The positioning means 38 send the current geographical coordinates to a computer 40 at a given frequency, for example depending on the speed and the level of granularity of the vehicle 10.

The computer 40, from the current geographical coordinates of the vehicle 10 and the data of the second digital model, can determine the current operational zone 24a, 24b and the necessary fineness of the monitoring, corresponding to the specific level of granularity in that operational zone 24a, 24b.

The computer 40 makes it possible to detect a change of operational zone 24a, 24b, or change of geographical zone 18 without change of operational zone 24a, 24b, or that there has been no change of geographical zone 18 for a certain amount of time.

In the event of a change in the current operational zone 24a, 24b, from an original operational zone toward a destination operational zone, the computer 40 can determine the complete address, i.e. the level of granularity and the identity 20, of the destination geographical zone 18, using the map 16 corresponding to the level of granularity associated with the destination operational zone 24a, 24b.

The computer 40 makes it possible to create messages including geographical zone 18 information, intended to inform, using radio communication means 42, all or some of the vehicles 10 of the communication network 12 of the position of the vehicle 10. The geographical zone information includes either the complete address of the geographical zone 18 of the vehicle 10 or a direction indication. The message also includes an identifier of the monitored vehicle 10 transmitting the message, in order to allow the other vehicles 10 receiving the message to update their geographical monitoring database by associating the identifier with the position, i.e. the complete address of the geographical zone 18, of the transmitting vehicle 10.

Within a vehicle 10, considered to be the receiving entity, the computer 40 can decode each received message so as to find the identifier of the transmitting vehicle 10 and either the complete address of its geographical zone 18 or its change of direction. In the case of reception of the change of direction, the computer 40 can extract, from the geographical monitoring database, the last known geographical zone 18 of the vehicle 10, then uses the change of direction to determine its new position, i.e. the complete address of the last geographical zone 18 of the transmitting vehicle 10. Then, the computer 40 updates its geographical database with the complete address corresponding to the last known position of the transmitting vehicle 10.

Preferably, the message also includes a reception reliability level of the message, and/or a number of hops of the message be relayed or a broadcast distance of the message. The reception reliability level of the message is, for example, a request to acknowledge receipt of the message by the receiving vehicle 10, so as to inform the transmitting vehicle 10 that the message has been properly received. The number of hops of the message to be relayed depends on the number of vehicles 10 of the communication network 12 the transmitting vehicle 10 wishes to inform. For example, for a number of hops equal to one, only the neighboring vehicles 10 directly accessible through a single radio link receive the message. For a number of hops equal to two, the directly accessible neighboring vehicles 10 also relay the message to other vehicles 10 directly accessible to them. The broadcast distance corresponds, for example, to a minimum broadcast radius of the message from the transmitting vehicle 10.

Preferably, the message includes a log of the last geographical zone messages, so as to offset any message losses. More specifically, the message includes the direction indication information previously sent and a number of messages already sent since the last sending of a message containing a complete address.

The radio communication means 42 can, in general, transmit/receive information, in ad hoc mode, with respect to all or some of the other vehicles 10 of the communication network 12. More specifically, the radio communication means 42 allow messages to be broadcast to at least the neighboring vehicles 10, and allow messages to be received at least from the neighboring vehicles 10.

FIG. 3 illustrates one way of encoding the direction information present in the messages broadcast during changes of geographical zones 18 of the vehicle 10, within a same operational zone.

In the group 22b of geographical zones 18, located on the left, a path is visible of the vehicle 10 passing through the different geographical zones 18, bearing respective identities 20 Id=1001, Id=1002, Id=1005, Id=1004, Id=1006, Id=1007, Id=1003, Id=1001, and Id=1004.

In group 22b, located on the right, the direction information is visible corresponding to the path of the vehicle 10 viewed in group 22b on the left. The shape of the geographical zone 18 used being of the hexagonal type, only six different directions are possible to go from one geographical zone 18 to the other, such that only three bits are necessary to encode the direction information. As an example, a direct match is made between a numerical direction information value and a geographical direction such as: one corresponds to a direction North, two corresponds to a direction Northeast, and so forth.

Thus, in the example of FIG. 3, upon each change of geographical zone 18 of the monitored vehicle 10, the direction information is successively: 5, 4, 2, 4, 2, 1, 6, and 4.

The method for monitoring vehicles 10 according to the invention will now be described in light of FIG. 4.

Before the mission, during a step 100, from the first digital model 14 comprising several maps 16 with different levels of granularity, each geographical zone 18 of each map 16 is identified by a complete address, then the set of complete addresses is added to the first digital model 14. Alternatively, the digital model 14 includes an algorithm for calculating the complete addresses.

At the end of this determination step or in parallel, during a step 110, different operational zones 24a, 24b are defined, by the operator, using their geographical coordinates within the second digital model monitored space. Then, each operational zone 24a, 24b is defined with a specific level of granularity, depending on the required fineness for monitoring in each operational zone 24a, 24b.

Then, during a configuration step 120, each vehicle 10 belonging to the communication network 12 is loaded with all of the data relative to the geographical zones 18 and the operational zones 24a, 24b. More specifically, the save means 36 of each vehicle 10 are loaded with the first and second digital models, either remotely or locally, for example using a USB (Universal Serial Bus) key.

During the mission, during a step 130, the positioning means 38 determine the current geographical coordinates of the monitored vehicle 10, using the GPS equipment and/or the inertial unit, then regularly send those coordinates to the computer 40.

During a step 135, upon receipt of the coordinates for the monitored vehicle 10, the computer 40 determines both the current operational zone 24a, 24b using the second digital model, and the associated level of granularity. Once the level of granularity is determined, the computer 40 determines the map 16 to be used in the first digital model 14.

During a step 138, the computer 40 determines the current geographical zone 18 of the map 16 with the determined granularity level containing the vehicle 10.

During a step 140, the computer 40 detects a change of operational and/or geographical zone by comparing the determined level of granularity to the applied level of granularity. If they are equal, the computer 40 determines whether the identity 20 of the current geographical zone 18 of the vehicle 14 has changed.

In the event there has been no change of operational zone 24a, 24b, or change of geographical zone 18, the computer 40 verifies whether a zone change timeframe is below a predetermined maximum timeframe threshold and the method returns to step 130.

In the event the computer 40 determines a change of operational zone 24a, 24b, during a step 150, the computer 40 applies the new determined level of granularity. Then, during a step 160, the computer 40 determines the complete address of the current geographical zone 18, from the identity 20 of the geographical zone 18 of the vehicle 10 and the specific level of granularity of the current operational zone 24a, 24b, and sends the determined complete address to the save means 36. Then, during a step 170, the computer 40 creates a message including the complete address of the current geographical zone 18, and the identifier of the vehicle 10 transmitting the message. Then, the computer 40 sends the created message to the radio communication means 42, which broadcast it to all or some of the vehicles 10 of the communication network 12. At the end of step 170, the method returns to the positioning step 130.

Taking the example of the path 26 of the vehicle 10a visible in FIG. 1, just before it goes from operational zone 24a to operational zone 24b, the vehicle 10a is located at the complete address (N=2, Id=1004), in the case where the level of granularity associated with the original operational zone 24a is N=2. After it leaves the operational zone 24a, the vehicle 10a transmits a message to all or some of the vehicles 10 including the complete address of its current geographical zone 18, i.e.: (N=1, Id=13).

In the event the zone change timeframe is above the predetermined maximum timeframe threshold, the method goes from step 140 to step 170.

In the event the computer 40 determines a change from one geographical zone 18 to another without a change of operational zone 24a, 24b, during a step 180, the computer 40 identifies the complete address of the current geographical zone 18 and sends the complete identified address to the save means 36. Then, during a step 190, the computer 40 calculates the number of messages sent with a direction indication and the time since the last zone change with the broadcast of a complete address.

If the number of messages sent with a direction indication is below a predetermined limit, the computer 40, during a step 200, creates a message including the direction information, and the identifier of the vehicle 10 transmitting the message. Then, the computer 40 sends the created message to the radio communication means 42, which broadcast it to all or some of the vehicles 10 of the communication network 12. At the end of the step 200, the method returns to the positioning step 130.

As an example, again looking at the example of the path 26 of the vehicle 10a visible in FIG. 1, when the vehicle 10a travels in the operational zone 24a with level of granularity N=2, just before it leaves that operational zone 24a, the vehicle 10a successively passes through the geographical zones 18 with the respective complete addresses: (N=2, Id=1001), (N=2, Id=1002), (N=2, Id=1004). It thus successively transmits two messages regarding direction indications 5 and 3, respectively.

If the number of messages sent with a direction indication is above the determined limit, the method goes from step 190 to step 170 for creating and broadcasting a message including the complete address of the current geographical zone 18.

Thus, the method according to the invention allows each vehicle 10 of the communication network 12 to determine its operational zone, its level of granularity, and any change of operational zone and/or geographical zone, independently, without communicating with a remote centralized server.

Furthermore, the position messages are essentially only broadcast in the event of a change of zone, and, in the case of a change of geographical zone within a same operational zone, only geographical zone information of a smaller size is sent to the other vehicles 10.

As a result, the data load circulating in the communication network is optimized, and the method according to the invention is thus particularly adapted to very restricted communication networks, i.e. with a very low bandwidth.

It should also be understood that the example embodiments presented above are not limiting. It can nevertheless be seen that the monitored space may have a variable topology, including a spatial dimension, for example: one can also see that the invention is applicable to all types of entities, for example such as aircrafts.

What is claimed is:

1. An entity moving in a monitored space represented by a first digital model comprising a set of maps with different levels of granularity representing a requested fineness of the monitoring, each map being divided into geographical zones of a predetermined shape, and having a size defined according to the level of granularity, the entity including:
   a saving unit for loading a set of data relative to the geographical zones associated with the maps of different levels of granularity,
   a positioning unit for positioning the entity, so as to determine the geographical coordinates of the monitored entity, and
   a detecting unit for detecting a change of geographical zone as a function of the geographical coordinates of the monitored entity, the monitored entity going from an original geographical zone to a destination geographical zone,
   wherein:
   the saving unit includes a data set relative to operational zones comprising a predefined level of granularity,
   the detecting unit is capable of independently detecting a change of operational zone, the monitored entity going from an original operational zone to a destination operational zone, and
   the entity includes a determining unit for independently determining a level of granularity to be applied from the original operational zone, and a new level of granularity as a function of the destination operational zone, in the case of a change of operational zone.

2. The entity according to claim 1, wherein the determining unit is specific to identifying the operational zone, so as to determine the level of granularity to be applied.

3. The entity according to claim 2, also including a broadcasting unit for broadcasting to other entities of the message including geographical zone information.

4. The entity according to claim 3, wherein the geographical zone information includes either the complete address of the geographical zone of the entity, or a direction indication.

5. The entity according to claim 3, wherein the message also includes an identifier for the entity, a reception reliability level of the message, and either a number of hops of the message to be relayed or a broadcast distance of the message.

6. The entity according to claim 3, wherein the message also includes a log of the last geographical zone messages, in order to overcome message losses.

7. The entity according to claim 1, wherein the shape of each geographical zone is hexagonal.

8. The entity according to claim 1, wherein the operational zones are defined on the second digital model of the monitored space, said second digital model being loaded into the entity.

* * * * *